July 3, 1962     A. W. WITBRO     3,041,770
FISH PULL SENSING DEVICE
Filed Oct. 19, 1959     2 Sheets-Sheet 1
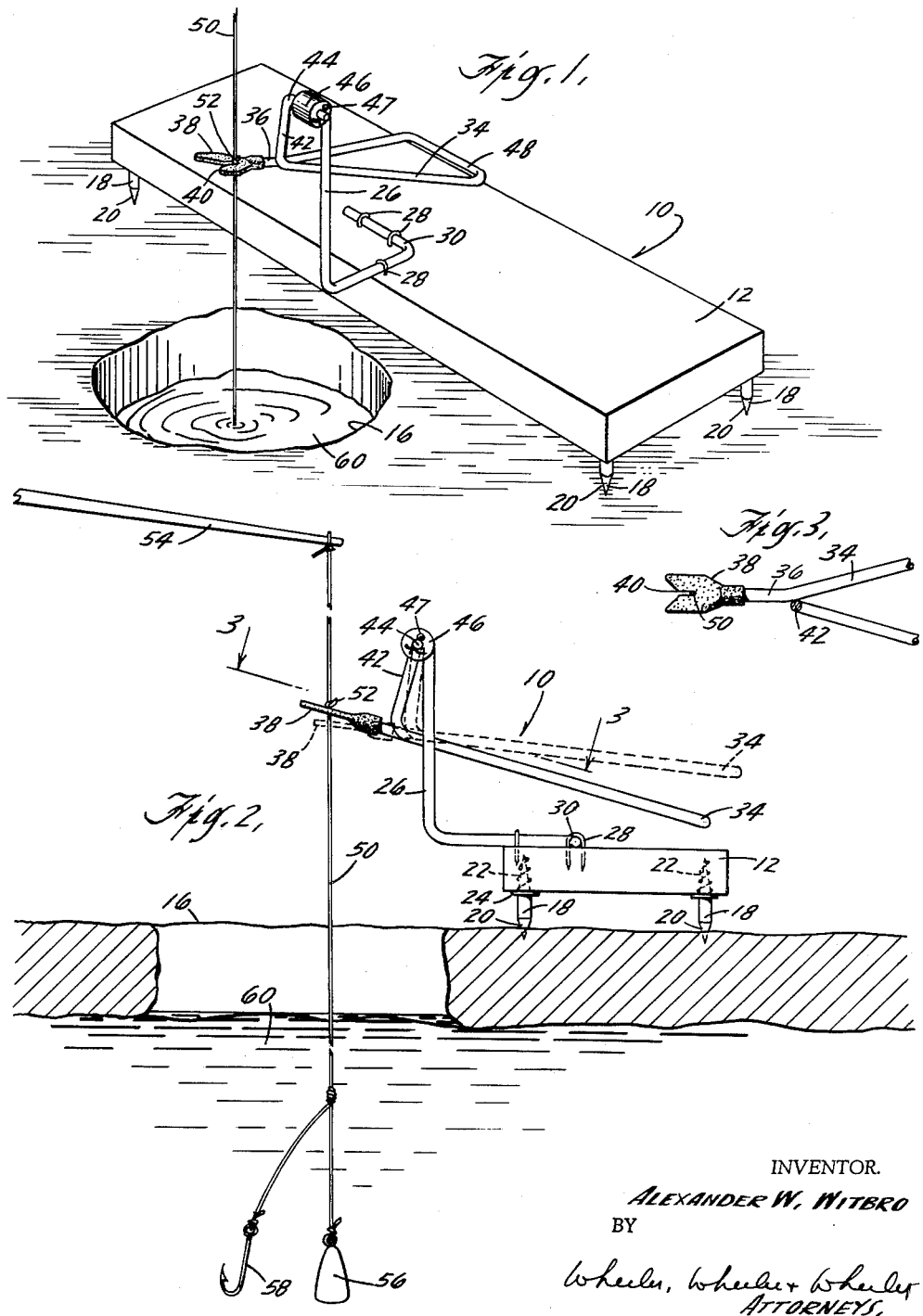
INVENTOR.
ALEXANDER W. WITBRO
BY
Wheeler, Wheeler & Wheeler
ATTORNEYS.

July 3, 1962
A. W. WITBRO
3,041,770
FISH PULL SENSING DEVICE
Filed Oct. 19, 1959
2 Sheets-Sheet 2
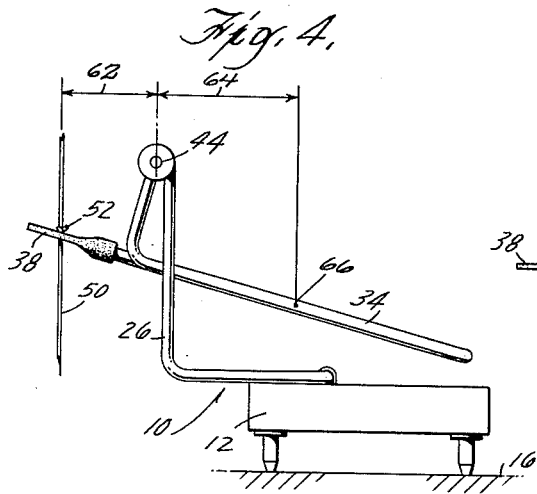
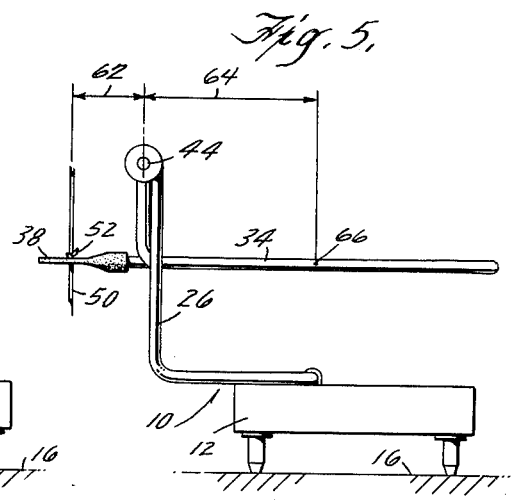
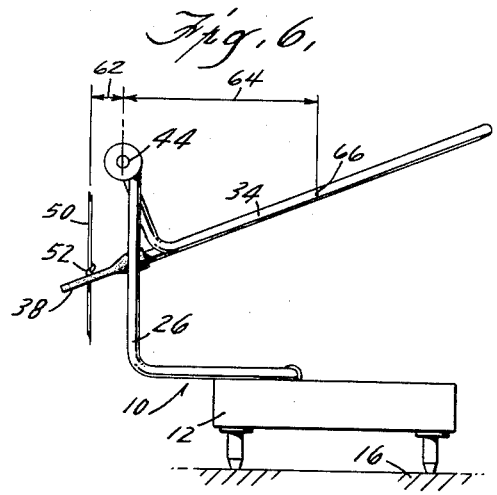
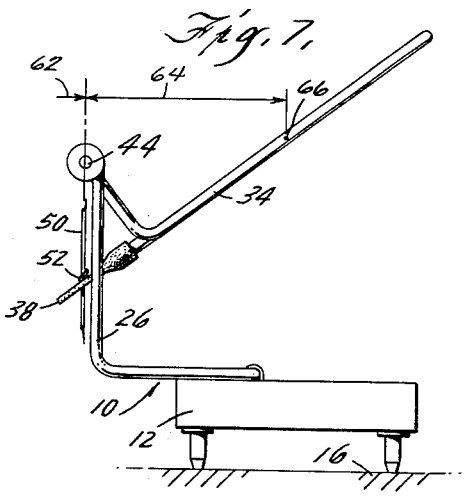
INVENTOR.
ALEXANDER W. WITBRO
BY
Wheeler, Wheeler & Wheeler
ATTORNEYS.

United States Patent Office 3,041,770
Patented July 3, 1962

3,041,770
FISH PULL SENSING DEVICE
Alexander W. Wilbro, 915 Memory Lane,
West De Pere, Wis.
Filed Oct. 19, 1959, Ser. No. 847,138
5 Claims. (Cl. 43—17)

This invention relates to a fish pull sensing device and more particularly to a nibble or strike warning device.

Fishermen have traditionally used cork or plastic bobbers or tip-up devices as a means of determining when a fish is nibbling or striking the bait. These prior devices have limitations which it is an object of the present invention to overcome.

Bobber action is affected by wind and choppy water surface preventing the fisherman from seeing a nibble. A tip-up may be actuated by a single strike or nibble when a fish has not actually taken the bait. Each time the tip-up is operated it must be re-set before it can be used again.

Ice fishing presents aggravated problems. A bobber may freeze against the side of the ice fishing hole. Occasionally the bobber will freeze in the surface water. The tip-up, as a result of its operation, may become splashed with water which subsequently freezes thereon to prevent the mechanism from operating properly. Parts of the tip-up which project into the water may freeze.

My invention overcomes the limitations of the devices mentioned above and is particularly valuable in overcoming the problems of ice fishing. Devices embodying my invention are extremely sensitive to pulls on the line. Basically I provide a balance arm to which the fish line is attached and which is free to teeter when the line is pulled. The arm is so delicately balanced that it will teeter in response to even the lightest pull or nibble on the bait. Stronger pulls may cause the balance arm to rattle against its base. In any event the balance arm will change position to apprise the fisherman of the nibble or strike.

An important feature of the invention is that the fish line is attached to the balance arm at a point offset laterally from the bearing on which the arm is suspended and that the arm is free to rotate as the pulling force on the line is increased to shorten the moment arm on which said force tends to rotate the arm about its pivot. At light pulls the moment arm is maximum and at heavy pulls the moment arm shortens and may be reduced to zero. At zero moment arm the balance arm will rotate no further. Because of the shifting moment arm the balance arm will assume different positions of equilibrium, depending on the force exerted on the line.

In the drawings:

FIG. 1 is a respective view of a device embodying the present invention used in ice fishing.

FIG. 2 is a side elevation of the device in FIG. 1.

FIG. 3 is a fragmentary view taken along line 3—3 of FIG. 2.

FIGS. 4–7 are side elevations of a device embodying the present invention showing the shifting of the moment arm as the force of the pull on the line changes and the balance arm assumes various positions.

The device shown in the drawings is illustrative of a preferred embodiment. The features of my invention may be variously modified and changed without departing from the spirit of my invention and therefore I do not wish to be limited to the particular device illustrated.

In the drawings there is shown a fish pull sensing device indicated generally by the numeral 10. The device illustrated includes a base 12 which may be made from a material such as wood. The illustration shows the device 10 used on ice 16. It may, however, be used to fish from a dock or a boat. The base has feet 18 which have points 20 and threaded surfaces 22 separated by flanges 24. The threaded ends of the feet 18 are positioned as desired and then turned into the base 12 as far as flanges 24 will permit. The base may then be set by embedding points 20 into the underlying surface represented in the drawings as ice 16. A teetering arm support mast 26 has a foot 30 mounted on base 12 by staples 28. At the desired point along foot 30 a right angled bend may be made to cause the foot to extend laterally past the edge of base 12. Mast 26 extends upwardly from that end of foot 30 which overhangs the water 60 beyond the edge of base 12.

Teetering arm 34 may be of any suitable shape and material. It is shown in the instant drawings to constitute wire bent into a triangle having a free end portion 36 extending forwardly from the apex of the triangle. A fork 38, having a slot 40 therein, is mounted on the end of forwardly extending section 36. Fork 38 has a socket 39 therein and is made from a resilient material such as rubber, which will provide elasticity to hold the fork 38 around section 36. Elasticity also permits flexing of fork 38 for the purpose of de-icing it. Extending upwardly from the apex of triangle 34, is a pivot arm 42. A bend is made at the end of pivot arm 42 remote from the apex of the triangle 34. A pivot bearing 46 is mounted at the top of support mast 26 and has a pivot opening therein to receive the pivot portion 44 of arm 42. A cotter key 47 is inserted through pin portion 44 to hold the pin 44 in pivotal engagement with pivot bearing 46.

The center of gravity 66 of the triangle portion of teetering arm 34 is normally spaced at one side of pivot bearing 46 a distance greater than the spacing at the opposite side of bearing 46 of fork 38. Accordingly summation of the moments of force about pivot bearing 46 when the device is unloaded results in a torsional unbalance of forces in the clockwise direction as the device is shown in the drawings. The unbalance of forces would normally cause the base 48 of teetering arm 34 to rest on base 12.

When in use the device is placed near the point where the user is fishing and a fishing line 50 is inserted into slot 40 and is suspended therefrom by a slip knot 52. The fish line 50 is illustrated as tied at one end to a pole 54. The use of a pole is optional. When used the fisherman may sit at any side of the device. The pole may have a reel and eyelets through which the line runs. The other end of fish line 50 has a sinker 56 tied thereon of sufficient weight to change the unbalance of torsional force and cause the teetering arm 34 to assume a position of equilibrium such as indicated in solid line in FIG. 2 wherein teetering arm base 48 is raised slightly from base 12. A hook 58 is fixed to line 50 adjacent to sinker 56. A bait or lure (not shown) may be attached to the hook 58 while fishing. The depth of the fishing is controlled by the placement of slip knot 52.

Assuming the device to be in use in the position of equilibrium indicated in solid line in FIG. 2, a fish nibbling at the bait disturbs the delicate balance of teetering arm 34. Arm 34 will then teeter between its position of equilibrium and positions at both sides thereof, including its normal position in which triangle base 48 rests against the base 12. The movement of arm 34 visibly warns the fisherman. If the teetering is violent enough arm 34 may rattle against base 12, giving an audible warning.

Should a fish strike the hook to exert considerable pull on the line, the balance arm will be moved toward or through the dotted line position shown in FIG. 2. Assuming maximum pull is exerted on the line 50 the teetering arm 34 will rotate in a counter clockwise direction about pivot 46 toward a position in which line 50 extends vertically downward on a line which, if extended, would run directly through the pivot. In this position there is no further torsional effect from the pull as the line 50 would be exerting force on a line of force directly through the pivot 46. If the pull becomes excessive the knot 52 may slip from slot 40 in fork 38. The device is then relieved of forces otherwise tending to pull it into the water.

Referring now particularly to FIGS. 4–7 the device embodying the present invention is shown diagrammatically in these figures in various successive positions in which changes in the amount of force applied to fork 38 cause teetering arm 34 to move toward successive new positions of equilibrium. As force is successively applied in increasing amounts to line 50 in a downward direction, moment arm 62, between pivot pin 44 and the point on fork 38 to which the thrust of line 50 is applied, becomes smaller in the successive views. At the same time the moment arm 64 between pivot pin 44 and the center of gravity 66 of the weighted portion of balance arm 34 will correspondingly increase throughout the same successive views. The action of shifting moment arm 62 diminishes it successively from its length in FIG. 4 to zero in FIG. 7.

Accordingly, the balance arm will assume a new position of equilibrium for each pulling force applied to line 50. The fisherman can thus ascertain the character and extent of the attack made by the fish on the hook. Clearly the fisherman will be apprised of a heavier pull on the line when the balance arm 34 assumes its position shown in FIGS. 6 or 7 than when it is in its FIG. 5 position. FIG. 7 is the extreme position of the arm 34 because line 50 is now aligned with pivot pin 44.

I claim:

1. A fish pull senser comprising a pivot pin bearing, means to support the bearing, a balance arm having a transverse pivot arm extending upwardly therefrom and a pivot pin at the upper end thereof rotatable in said bearing, said balance arm being suspended by said pivot arm in offset relation to said bearing and therebeneath, said balance arm having a weight at one side of the bearing and a fish line coupling at the other side of the bearing, said balance arm being free to pivot about said bearing in response to fish pull on a line connected to said coupling, between a first position in which the moment arm of the force pulling on the line and tending to rotate the balance arm about the pivot is relatively great and the moment arm of the weight opposing said force is relatively small and a second position in which the force moment arm is relatively small and the weight moment arm is relatively great.

2. The device of claim 1 in which the means to support the bearing comprises, a base and a mast on which said pivot pin bearing is supported above said base.

3. The device of claim 2 in further combination with a sinker on said fish line having sufficient weight whereby said balance arm assumes the position of equilibrium with the weighted end spaced from said base whereby nibbling action of a fish disturbs the equilibrium of the balance arm and rattles the balance arm against the base.

4. The device of claim 1 in which the fish line coupling includes a fork bifurcated for the engagement of the fish line and flexible for the removal of ice.

5. A fish pull senser comprising a pivot pin bearing, means to support the bearing, a balance arm having a transverse pivot arm extending upwardly therefrom and a pivot pin at the upper end thereof rotatable in said bearing, said balance arm being suspended by said pivot arm in offset relation to said bearing and therebeneath, said balance arm having a weight at one side of the bearing and a fish line coupling at the other side of the bearing, said balance arm being free to pivot about said bearing in response to fish pull on a line connected to said coupling, the moment arm of the force pulling on the line and tending to rotate the balance arm about the pivot and the moment arm of the weight which opposes said force varying inversely in length as the balance arm rotates whereby the balance arm will assume different positions of equilibrium depending on the magnitude of said force.

References Cited in the file of this patent

UNITED STATES PATENTS

| 962,309 | Butler | June 21, 1910 |
| 2,663,962 | King | Dec. 29, 1953 |
| 2,826,856 | Marion et al. | Mar. 18, 1958 |